United States Patent [19]
Makino et al.

[11] Patent Number: 5,073,465
[45] Date of Patent: Dec. 17, 1991

[54] ELECTROPHOTOGRAPHIC PHOTORECEPTOR COMPRISING A TRISAZO CHARGE GENERATING COMPOUND

[75] Inventors: Naonori Makino; Satoshi Hoshi; Shigeru Ohno; Katsuji Kitatani, all of Kanagawa, Japan

[73] Assignee: Fuji Photo Film Co., Ltd., Kanagawa, Japan

[21] Appl. No.: 524,955

[22] Filed: May 18, 1990

[30] Foreign Application Priority Data

May 18, 1989 [JP] Japan .................. 1-125383
May 19, 1989 [JP] Japan .................. 1-126282

[51] Int. Cl.⁵ .................. G03G 5/06
[52] U.S. Cl. .................. 430/58; 430/59
[58] Field of Search .................. 430/58, 59

[56] References Cited

U.S. PATENT DOCUMENTS

4,567,124  1/1986  Ohta et al. .................. 430/59
4,769,302  9/1988  Ueda .................. 430/59
4,810,607  3/1989  Matsumoto et al.

*Primary Examiner*—David Welsh
*Assistant Examiner*—S. Rosasco
*Attorney, Agent, or Firm*—Sughrue, Mion, Zinn, Macpeak & Seas; Sughrue, Mion, Zinn, Macpeak & Seas

[57] ABSTRACT

An novel electrophotographic photoreceptor is provided comprising on an electrically conductive support a layer containing a charge-transporting compound and a charge-generating compound or a charge-transporting compound-containing layer and a charge-generating compound-containing layer, wherein said charge-generating compound is a trisazo compound represented by the general formula (1):

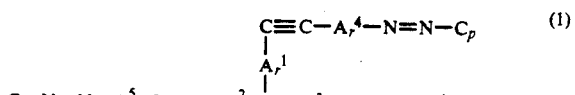

wherein $Ar^1$, $Ar^2$, $Ar^3$, $Ar^4$, $Ar^5$ and $Ar^6$ each represents an arylene group, divalent condensed polycyclic aromatic group or divalent group derived from a monocyclic or condensed polycyclic heterocyclic aromatic group, each of which may have one or more substituents; $C_p$ respresents a coupler residual group; and n represents 1 or 2.

13 Claims, No Drawings

ELECTROPHOTOGRAPHIC PHOTORECEPTOR COMPRISING A TRISAZO CHARGE GENERATING COMPOUND

FIELD OF THE INVENTION

The present invention relates to an electrophotographic photoreceptor comprising an electrophotographic light-sensitive layer containing a novel trisazo compound.

BACKGROUND OF THE INVENTION

As photoconductive compositions to be incorporated in electrophotographic photoreceptors there have heretofore been well known inorganic substances such as selenium, cadmium sulfide, zinc oxide and amorphous silicon. These inorganic substances are advantageous in that they have excellent electrophotographic properties. In particular, these inorganic substances exhibit an extremely excellent photoconductivity, charge acceptability in a dark place and insulating properties. On the contrary, however, these inorganic substances have various disadvantages. For example, selenium photoreceptors are expensive to manufacture, have no flexibility and cannot withstand thermal or mechanical shock. Cadmium sulfide photoreceptors can cause a pollution problem because cadmium is a toxic substance. Zinc oxide is disadvantageous in that it exhibits a poor image stability after repeated use. Furthermore, amorphous silicon photoreceptors are extremely expensive to manufacture and also require a special surface treatment to prevent surface deterioration thereof.

In recent years, electrophotographic photoreceptors comprising various organic substances have been proposed and some of them have been put into practical use to eliminate the disadvantages of inorganic substances. Examples of these approaches include electrophotographic photoreceptors comprising poly-N-vinylcarbazole and 2,4,7-trinitrofluorenone-9-one as disclosed in U.S. Pat. No. 3,484,237, electrophotographic photoreceptors comprising poly-N-vinylcarbazole sensitized with a pyrilium salt dye as disclosed in JP-B-48-25658 (the term "JP-B" as used herein means an "examined Japanese patent publication"), and electrophotographic photoreceptors comprising as a main component a eutectic complex of a dye and a resin as disclosed in JP-A-47-10375 (the term "JP-A" as used herein means an "unexamined published Japanese patent application").

Furthermore, many active studies and proposals have recently been made with regard to electrophotographic photoreceptors comprising as main components organic pigments such as perylene pigment (as described in U.S. Pat. No. 3,371,884), phthalocyanine pigment (as described in U.S. Pat. Nos. 3,397,086 and 4,666,802), azulenium salt pigment (as described in JP-A-59-53850 and JP-A-61-212542), squalium salt pigment (as described in U.S. Pat. Nos. 4,396,610 and 4,644,082) and polycyclic quinone pigment (as described in JP-A-59-184348 and JP-A-62-28738) or the following azo pigments:

Bisazo pigments as disclosed in JP-A-47-37543, JP-A-56-116039, JP-A-58-123541, JP-A-61-260250, JP-A-61-228453, JP-A-61-275849 and JP-A-61-275850, and JP-B-60-5941 and JP-B-60-45664;

Trisazo pigments as disclosed in U.S. Pat. Nos. 4,436,800 and 4,439,506, and JP-A-53-132347, JP-A-55-69148, JP-A-57-195767, JP-A-57-200045, JP-A-57-204556, JP-A-58-31340, JP-A-58-31341, JP-A-58-154560, JP-A-58-160358, JP-A-58-160359, JP-A-59-127044, JP-A-59-196366, JP-A-59-204046, JP-A-59-204841, JP-A-59-218454, JP-A-60-111249, JP-A-60-111250, JP-A-61-11754, JP-A-61-22346, JP-A-61-35451, JP-A-61-67865, JP-A-61-121059, JP-A-61-163969, JP-A-61-179746, JP-A-61-230157, JP-A-61-251862, JP-A-61-251865, JP-A-61-269164, JP-A-62-21157, JP-A-62-78563 and JP-A-62-115452; and Tetrakisazo pigments as disclosed in U.S. Pat. No. 4,447,513, and JP-A-60-108857, JP-A-60-108858, JP-A-60-111247, JP-A-60-111248, JP-A-60-118843, JP-A-60-176046, JP-A-61-103157, JP-A-61-117559, JP-A-61-182051, JP-A-61-194447, JP-A-61-196253, JP-A-61-212848, JP-A-61-240246, JP-A-61-273548, JP-A-61-284769, JP-A-62-18565, JP-A-62-18566, and JP-A-62-19875.

On the other hand, small-sized and inexpensive semiconducting lasers having an oscillating wavelength in the range of 780 nm to 830 nm have recently been put into practical use. High sensitivity near infrared-sensitive photoreceptors have been disclosed for use in electrophotographic systems utilizing these semiconducting lasers as light sources.

These electrophotographic photoreceptors can attain some improvement in mechanical properties and flexibility in comparison with the above-described inorganic electrophotographic photoreceptors. However, these electrophotographic photoreceptors leave to be desired in sensitivity. These electrophotographic photoreceptors are also disadvantageous in that they may exhibit some change in electrical properties upon repeated use. Thus, these electrophotographic photoreceptors do not necessarily satisfy the requirements for electrophotographic photoreceptors.

SUMMARY OF THE INVENTION

It is therefore an object of the present invention to provide a novel electrophotographic photoreceptor which exhibits a high sensitivity and durability.

It is another object of the present invention to provide a novel electrophotographic photoreceptor which exhibits a small change in light-sensitivity upon repeated use.

The above and other objects of the invention will become more apparent from the following detailed description and examples.

These objects of the present invention are accomplished with an electrophotographic photoreceptor comprising on an electrically conductive support a layer containing a charge-transporting compound and a charge-generating compound or a charge-transporting compound-containing layer and a charge-generating compound-containing layer, wherein said charge-generating compound is a novel trisazo compound represented by the general formula (1):

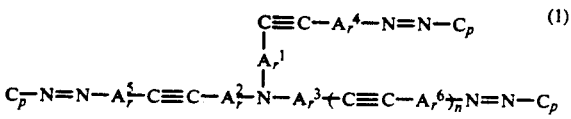

wherein Ar$^1$, Ar$^2$, Ar$^3$, Ar$^4$, Ar$^5$ and Ar$^6$ each represents an arylene group, divalent condensed polycyclic aromatic group or divalent group derived from a monocyclic or condensed polycyclic heterocyclic aromatic group, each of which may have one or more substituents; Cp represents a coupler residual group; and n represents 0 or 1.

DETAILED DESCRIPTION OF THE INVENTION

The trisazo compound represented by the general formula (1) will be further illustrated hereafter.

Examples of the group represented by $Ar^1$, $Ar^2$, $Ar^3$, $Ar^4$, $Ar^5$ and $Ar^6$ include an arylene group such as phenylene, naphthylene, antolylene, biphenylene and terphenylene, a divalent group derived from a condensed polycyclic aromatic group such as indene, fluorene, acenaphthene, perylene, fluorenone, anthrone, anthraquinone, benzoanthrone and isocoumarin, and a divalent group derived from a monocyclic or condensed polycyclic heterocyclic aromatic group such as pyridine, quinoline, oxazole, thiazole, oxadiazole, benzoxazole, benzoimidazole, benzothiazole, benzotriazole, dibenzofuran, carbazole and xanthene. In $Ar^1$ to $Ar^6$, the arylene group and condensed polycyclic aromatic group have 6 to 24 carbon atoms and the monocyclic or condensed polycyclic heterocyclic aromatic group is $C_{6-24}$ 5 to 8 membered one containing 1 to 3 hetero atoms(s) (e.g., nitrogen, oxygen, sulfur).

If $Ar^1$, $Ar^2$, $Ar^3$, $Ar^4$, $Ar^5$ and $Ar^6$ contain substituents, examples of such substituents include a $C_{1-18}$ alkyl group, $C_{1-18}$ alkoxy group, dialkylamino group containing two $C_{1-18}$ alkyl groups, $C_{1-18}$ acyl group, $C_{1-18}$ acyloxy group, $C_{1-18}$ amide group, $C_{6-15}$ aryl group, $C_{6-15}$ aryloxy group, halogen atom, hydroxy group, carboxyl group, nitro group, cyano group, and trifluoromethyl group.

$C_p$ represents a known coupler residual group which undergoes reaction with a diazonium salt and is preferably a known coupler residual group used as a charge-generating compound for electrophotographic photoreceptors. In particular, examples of coupler residual groups which can be used as $C_p$ include those having the following structural formulae:

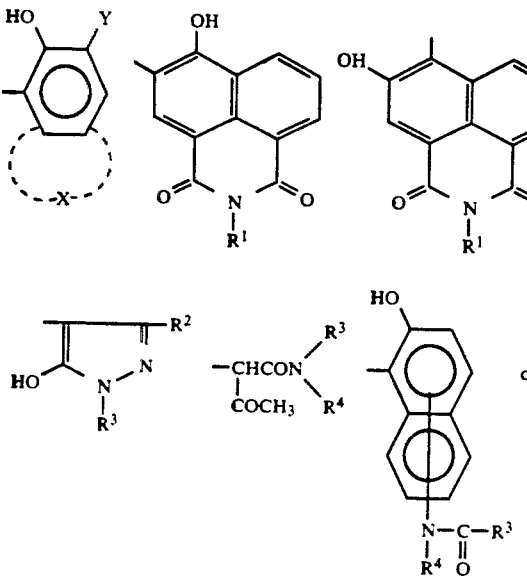

-continued

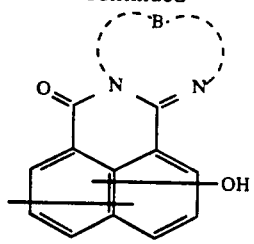

X in the general formula $C_p$ represents an atomic group required to undergo condensation with the benzene ring to which the hydroxyl group and Y are bonded to form an aromatic ring (having 10 to 24 carbon atoms) such as naphthalene and anthracene or a heterocyclic group (which is 5 to 8 membered and contains 1 to 3 hetero atoms, e.g., N, 0, S) such as indole, carbazole, benzocarbazole and dibenzofuran.

If X forms an aromatic ring or heterocyclic group containing substituents, examples of such substituents include a halogen atom (e.g., fluorine, chlorine, bromine), $C_{1-18}$ alkyl group (e.g., methyl, ethyl, propyl, butyl, dodecyl, octadecyl, isopropyl, isobutyl), trifluoromethyl group, nitro group, amino group, cyano group, $C_{1-8}$ alkoxy group (e.g., methoxy, ethoxy, butoxy). These substituents can be used singly or in combination and can substitute at any position.

Y represents $-CONR^3R^4$, $-CONHN=CR^3R^4$, $-COOR^3$ or a $C_{3-18}$ 5- or 6-membered heterocyclic group (containing 1 to 3 hetero atoms, e.g., N, 0, S) which may contain substituents.

$R^1$ represents a $C_{1-12}$ alkyl or $C_{6-24}$ aryl group.

If $R^1$ is an unsubstituted alkyl group, specific examples of such an unsubstituted alkyl group include methyl group, ethyl group, propyl group, butyl group, pentyl group, hexyl group, isopropyl group, isobutyl group, isoamyl group, isohexyl group, neopentyl group, and tert-butyl group.

If $R^1$ is a substituted alkyl group, examples of such substituents include hydroxyl group, $C_{1-12}$ alkoxy group, cyano group, amino group, $C_{1-12}$ alkylamino group, dialkylamino group containing two $C_{1-12}$ groups, halogen atom, and $C_{6-15}$ aryl group. Examples of such a substituted alkyl group include hydroxylalkyl group (e.g., hydroxymethyl, 2-hydroxyethyl, 3-hydroxypropyl, 2-hydroxypropyl), alkoxyalkyl group (e.g., methoxymethyl, 2-methoxyethyl, 3-methoxypropyl, ethoxymethyl, 2-ethoxyethyl), cyanoalkyl group (e.g., cyanomethyl, 2-cyanoethyl), aminoalkyl group (e.g., aminomethyl, 2-aminoethyl, 3-aminomethyl), (alkylamino)alkyl group (e.g., (methylamino)methyl, 2-(methylamino)ethyl, (ethylamino)methyl), (dialkylamino)alkyl group (e.g., (dimethylamino)methyl, 2-(dimethylamino)ethyl), halogenoalkyl group (e.g., fluoromethyl, trifluoromethyl, chloromethyl), and aralkyl group (e.g., benzyl, phenethyl).

If $R^1$ is an unsubstituted aryl group, specific examples thereof include, e.g., phenyl group, naphthyl group, and anthryl group.

If $R^1$ is a substituted aryl group, examples of substituents which can be contained in such a substituted aryl group include hydroxyl group, $C_{1-12}$ alkoxy group, cyano group, amino group, $C_{1-12}$ alkylamino group, dialkylamino group containing two $C_{1-12}$ alkyl groups, $C_{6-12}$ arylazo group, halogen atom, $C_{1-12}$ alkyl group, nitro group, and trifluoromethyl group. Examples of such a substituted aryl group include hydroxyphenyl group alkoxyphenyl group (e.g., methoxyphenyl, ethoxyphenyl), cyanophenyl group, aminophenyl group, (alkylamino)phenyl group (e.g., (methylamino)phenyl, (ethylamino)phenyl), (dialkylamino)phenyl group (e.g., (dimethylamino)phenyl, (diethylamino)phenyl), halogenophenyl group (e.g., fluorophenyl, chlorophenyl, bromophenyl), alkylphenyl group (e.g., tolyl, ethylphenyl, cumenyl, xylyl, mesityl), nitrophenyl group, trifluoromethylphenyl group, and aryl group containing two or three such substituents (which may be the same or different). These substituents may substitute at any position.

Examples of the group represented by $R^2$ include hydrogen atom, $C_{1-6}$ lower alkyl group, carbamoyl group, carboxyl group, alkoxycarbonyl group containing $C_{1-12}$ alkoxy group, aryloxycarbonyl group containing $C_{6-20}$ aryloxy group, and substituted or unsubstituted amino group.

If $R^2$ is a substituted amino group, specific examples of such a substituted amino group include methylamino group, ethylamino group, propylamino group, phenylamino group, tolylamino group, benzylamino group, diethylamino group, and diphenylamino group.

If $R^2$ is a lower alkyl group, specific examples of such a lower alkyl group include methyl group, ethyl group, propyl group, butyl group, isopropyl group, and isobutyl group.

If $R^2$ is an alkoxycarbonyl group, specific examples of such an alkoxycarbonyl group include methoxycarbonyl group, ethoxycarbonyl group, propoxycarbonyl group, butoxycarbonyl group, isopropoxycarbonyl group, and benzyloxycarbonyl group.

If $R^2$ is an aryloxycarbonyl group, specific examples of such an aryloxycarbonyl group include phenoxycarbonyl group, and toluoxycarbonyl group.

Examples of the group represented by $R^3$ include $C_{1-20}$ alkyl group, $C_{6-24}$ aromatic hydrocarbon group such as phenyl group and naphthyl group, aromatic heterocyclic group such as dibenzofuranyl group, carbazolyl group and dibenzocarbazolyl group, and compounds obtained by substituting these groups with substituents. The aromatic heterocyclic group is $C_{6-24}$ 5 to 8 membered one containing 1 to 3 hetero atom(s) (e.g., N, S, O).

If $R^3$ is a substituted or unsubstituted alkyl group, specific examples of such a substituted or unsubstituted alkyl group include those described with reference to the substituted or unsubstituted alkyl group represented by $R^1$.

If $R^3$ is an aromatic hydrocarbon group or aromatic heterocyclic group containing substituents, specific examples of substituents which can be contained in such a substituted aromatic hydrocarbon or aromatic heterocyclic group include hydroxyl group, cyano group, nitro group, halogen atom (e.g., fluorine, chlorine, bromine), $C_{1-18}$ alkyl group (e.g., methyl, ethyl, propyl, isopropyl), $C_{1-12}$ alkoxy group (e.g., methoxy, ethoxy, propoxy, butoxy, pentyloxy, isopropoxy, isobutoxy, isoamyloxy, tert-butoxy, neopentyloxy), trifluoromethyl group, trimethylsilyl group, methanesulfonyl group, amino group, $C_{1-12}$ alkylamino group (e.g., methylamino, ethylamino, propylamino), $C_{1-12}$ dialkylamino group (e.g., dimethylamino, diethylamino, N-methyl-N-ethylamino), $C_{6-12}$ arylamino group (e.g., phenylamino, tolylamino), diarylamino group containing two $C_{6-15}$ aryl groups (e.g., diphenylamino), $C_{12-24}$ arylazo group (e.g., phenylazo, chlorophenylazo, fluorophenylazo, bromophenylazo, cyanophenylazo, ethoxycarbonylphenylazo, nitrophenylazo, acetamidophenylazo, methoxyphenylazo, methylphenylphenylazo, n-octylphenylazo, trifluoromethylazo, trimethylsilylazo, methanesulfonylazo), carboxyl group, alkoxycarbonyl group containing $C_{1-18}$ alkoxy groups (e.g., methoxycarbonyl, ethoxycarbonyl), aryloxycarbonyl group containing $C_{6-16}$ aryloxy groups (e.g., phenoxycarbonyl, naphthoxycarbonyl), carboxylate of alkaline metal (examples of alkaline metal cations include $Na^\oplus$, $K^\oplus$ and $Li^\oplus$), sulfonate of alkaline metal (examples of alkaline metal cations include $Na^\oplus$, $K^\oplus$ and $Li^\oplus$), alkylcarbonyl group (e.g., acetyl, propionyl, benzylcarbonyl), arylcarbonyl group containing $C_{6-12}$ aryl group (e.g., benzoyl, toluoyl), $C_{1-12}$ alkylthio group (e.g., methylthio, ethylthio), and $C_{1-12}$ arylthio group (e.g., phenylthio, tolylthio). The aromatic hydrocarbon or aromatic heterocyclic group can contain 1 to 5 such substituents. If a plurality of such substituents are connected to the aromatic hydrocarbon or aromatic heterocyclic group, they may be the same or different. These substituents may substitute at any position.

Examples of the group represented by $R^4$ include hydrogen atom and those described with reference to $R^3$.

If Y represents an unsubstituted 5- or 6-membered heterocyclic group, specific examples of such an unsubstituted 5- or 6-membered heterocyclic group include imidazole ring, oxazole ring, thiazole ring, benzoimidazole ring, benzothiazole ring, benzoxazole ring, pyrimidine ring, and perimidine ring.

If Y represents a 5- or 6-membered heterocyclic group containing substituents, specific examples of such substituents include those described with reference to $R^3$ wherein $R^3$ is an aromatic hydrocarbon group containing substituents.

If $C_p$ is

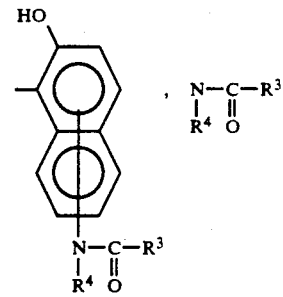

can substitute at the 3- to 8-position, preferably 8-position, of the naphthalene ring.

B represents a divalent $C_{6-14}$ aromatic hydrocarbon group or $C_{4-14}$ heterocyclic group (containing 1 to 6 hetero atoms, e.g., N, O, S) which may be substituted by alkyl group, halogen atom, nitro group, trifluoromethyl group, cyano group or hydroxy group. Examples of such a divalent aromatic hydrocarbon group include o-phenylene group, o-naphthylene group, perinaphthylene group, 1,2-anthraquinonylene group, and 9,10-phenanthrylene group. As a heterocyclic group, a nitrogen-containing heterocyclic group is preferred. Examples of such a nitrogen-containing heterocyclic group include 3,4-pyrazolediil group, 2,3-pyridiil group, 4,5-pyrimidinediil group, 6,7-indazolediil group, 5,6-benzimidazolediil group, and 6,7-quinolinediil group.

Specific examples of the present trisazo compound will be set forth in Tables 1-A and 1-B below, but the present invention should not be construed as being limited thereto. In these specific examples, Cp indicates a coupler residue set forth in Tables 2, 3 and 4.

TABLE 1-A
(n = 1)
| Compound Group No. | Ar¹ | Ar² | Ar³ | Ar⁴ | Ar⁵ | Ar⁶ |
|---|---|---|---|---|---|---|
| 1 |  |  |  | 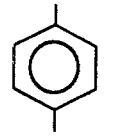 | 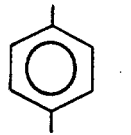 |  |
| 2 |  |  | 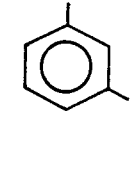 | 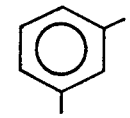 | 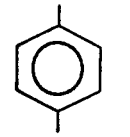 | 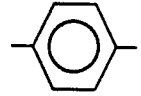 |
| 3 |  |  |  | 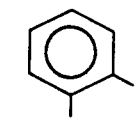 | 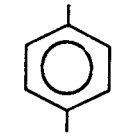 | 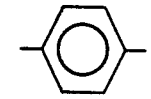 |
| 4 |  |  | 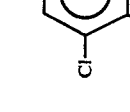 | 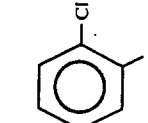 | 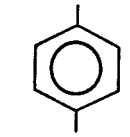 | 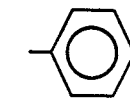 |
| 5 |  |  |  | 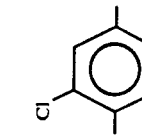 | 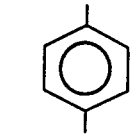 | 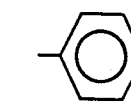 |
| 6 |  |  | 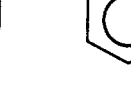 | 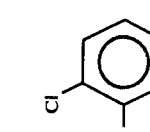 | 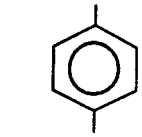 | 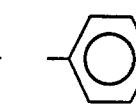 |

TABLE 1-A-continued
(n = 1)
| Compound Group No. | Ar¹ | Ar² | Ar³ | Ar⁴ | Ar⁵ | Ar⁶ |
|---|---|---|---|---|---|---|
| 7 |  |  |  |  | 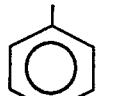 |  |
| 8 |  |  |  |  |  | 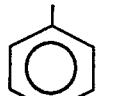 |
| 9 |  |  |  |  | 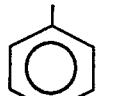 |  |
| 10 |  | 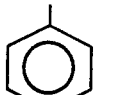 | 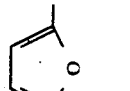 | 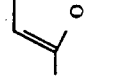 | 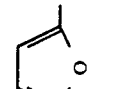 |  |
| 11 | 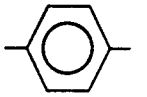 | 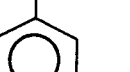 | 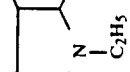 | 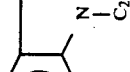 | 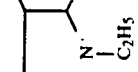 |  |

TABLE 1-A-continued
(n = 1)

| Compound Group No. | Ar¹ | Ar² | Ar³ | Ar⁴ | Ar⁵ | Ar⁶ |
|---|---|---|---|---|---|---|
| 12 | phenylene (1,4) | phenylene (1,4) | phenyl | pyridyl | pyridyl | pyridyl |
| 13 | 2-methyl-phenylene (1,4) | 3-methyl-phenylene | 2-methylphenyl | phenylene (1,4) | phenylene (1,4) | phenylene (1,4) |
| 14 | 2-chloro-phenylene (1,4) | 3-chloro-phenylene | 2-chlorophenyl | phenylene (1,4) | phenylene (1,4) | phenylene (1,4) |
| 15 | phenylene (1,4) | naphthylene | naphthyl | phenylene (1,3) | phenylene (1,3) | phenylene (1,3) |
| 16 | phenylene (1,4) | phenylene (1,4) | 2-thienyl | phenylene (1,4) | phenylene (1,4) | phenylene (1,4) |

TABLE 1-B
| Compound Group No. | Ar¹ | Ar² | Ar³ | Ar⁴ | Ar⁵ |
|---|---|---|---|---|---|
| | | (n = 0) | | | |
| 1 |  | 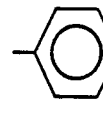 | 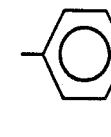 | 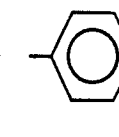 | 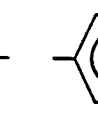 |
| 2 | 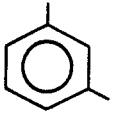 | 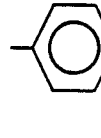 | 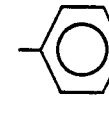 | 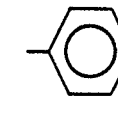 | 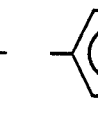 |
| 3 |  |  |  |  |  |
| 4 | 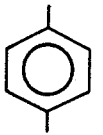 | 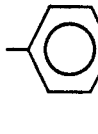 | 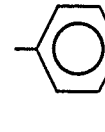 | 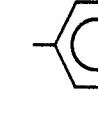 | 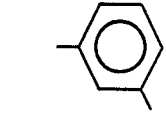 |
| 5 | 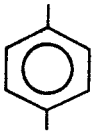 | 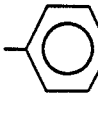 | 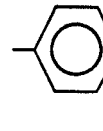 | 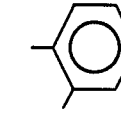 | 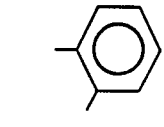 |
| 6 | 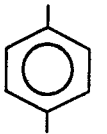 | 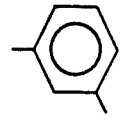 | 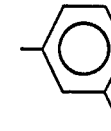 | 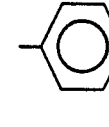 | 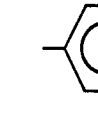 |
| 7 | 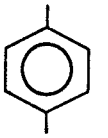 | 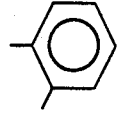 | 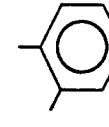 | 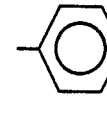 | 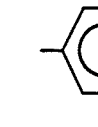 |
| 8 | 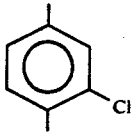 | 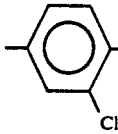 | 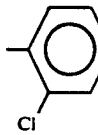 | 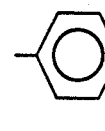 | 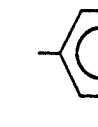 |
| 9 | 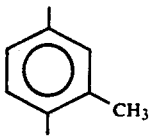 | 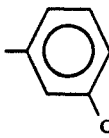 | 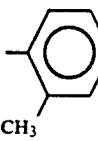 | 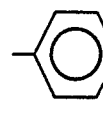 | 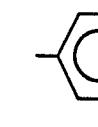 |
| 10 | 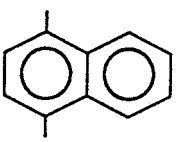 | 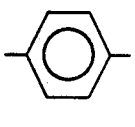 | 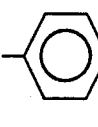 | 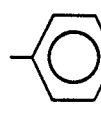 | 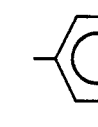 |

TABLE 1-B-continued
(n = 0)
| Compound Group No. | Ar¹ | Ar² | Ar³ | Ar⁴ | Ar⁵ |
|---|---|---|---|---|---|
| 11 | 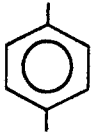 | 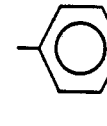 | 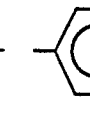 | 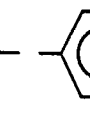 | 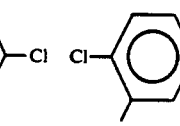 |
| 12 |  | 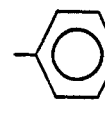 | 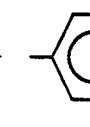 | 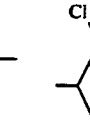 | 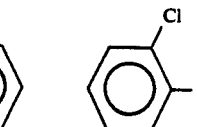 |
| 13 | 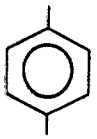 | 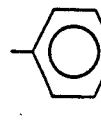 | 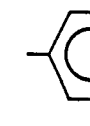 | 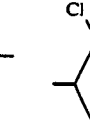 | 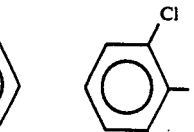 |
| 14 | 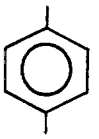 | 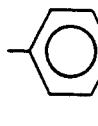 | 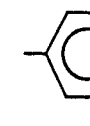 | 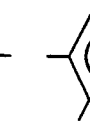 | 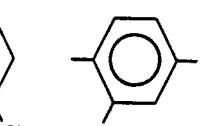 |
| 15 | 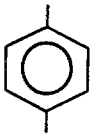 | 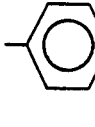 | 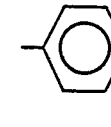 | 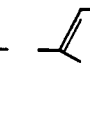 | 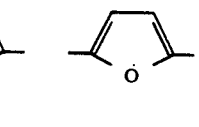 |
| 16 | 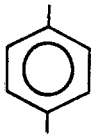 | 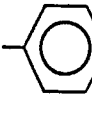 | 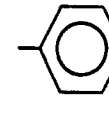 | 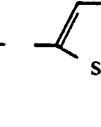 | 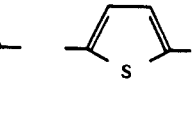 |
| 17 | 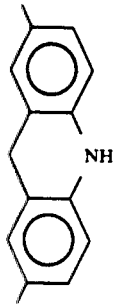 | 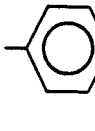 | 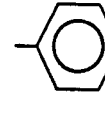 | 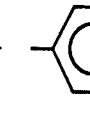 | 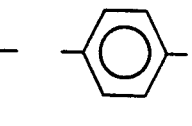 |

TABLE 1-B-continued (n = 0)

| Compound Group No. | Ar¹ | Ar² | Ar³ | Ar⁴ | Ar⁵ |
|---|---|---|---|---|---|
| 18 | acridone (C=O, NH bridged diphenyl) | phenyl | phenyl | phenyl | phenyl |
| 19 | phenyl | furan-2,5-diyl | furan-2,5-diyl | phenyl | phenyl |
| 20 | phenyl | thiophene-2,5-diyl | thiophene-2,5-diyl | phenyl | phenyl |
| 21 | phenyl | phenyl-CF₃ | phenyl-CF₃ | phenyl | phenyl |
| 22 | phenyl | 2,5-dichlorophenyl | 2,5-dichlorophenyl | phenyl | phenyl |
| 23 | phenyl | phenyl-OCH₃ | phenyl-OCH₃ | phenyl | phenyl |
| 24 | pyridine-2,5-diyl | phenyl | phenyl | pyridine-2,5-diyl | pyridine-2,5-diyl |

TABLE 2
| Cp. No. | Cp |
|---|---|
| (Cp-1) | 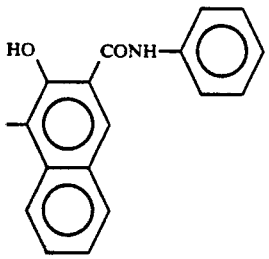 |
| (Cp-2) | 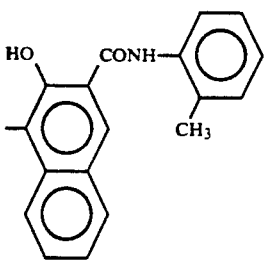 |
| (Cp-3) | 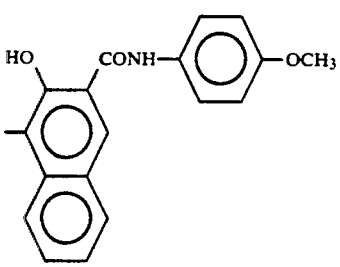 |
| (Cp-4) | 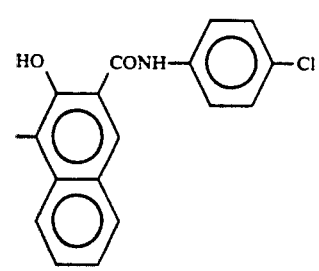 |
| (Cp-5) | 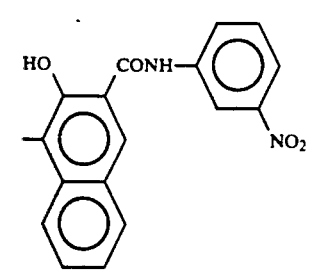 |
| (Cp-6) | 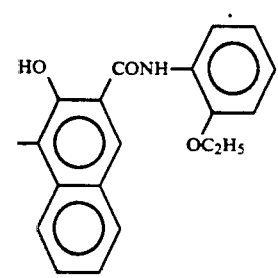 |
| (Cp-7) | 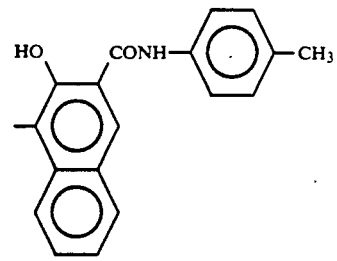 |
| (Cp-8) | 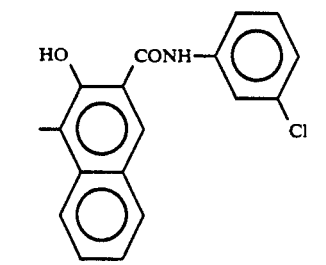 |
| (Cp-9) | 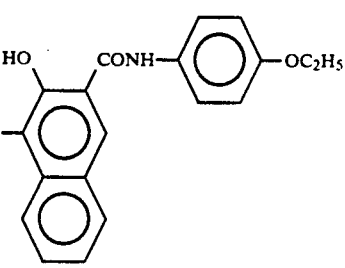 |
| (Cp-10) | 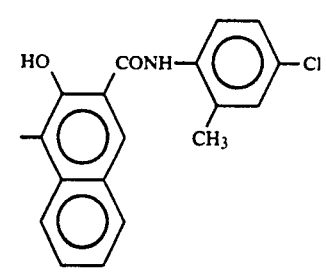 |
| (Cp-11) | 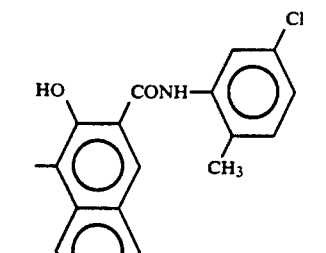 |
| (Cp-12) | 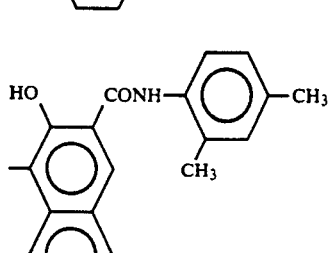 |

TABLE 2-continued

| Cp. No. | Cp |
|---|---|
| (Cp-13) | 3-hydroxy-4-methyl-N-(5-chloro-2-methoxyphenyl)-2-naphthamide |
| (Cp-14) | 3-hydroxy-4-methyl-N-(2,5-dimethoxyphenyl)-2-naphthamide |
| (Cp-15) | 3-hydroxy-4-methyl-N-(4-chloro-2,5-dimethoxyphenyl)-2-naphthamide |
| (Cp-16) | 3-hydroxy-4-methyl-N-(5-chloro-2,4-dimethoxyphenyl)-2-naphthamide |
| (Cp-17) | 3-hydroxy-4-methyl-N-(1-naphthyl)-2-naphthamide |
| (Cp-18) | 3-hydroxy-4-methyl-N-(2-naphthyl)-2-naphthamide |
| (Cp-19) | 3-hydroxy-4-methyl-N-(2-methoxyphenyl)-2-naphthamide |
| (Cp-20) | 3-hydroxy-4-methyl-N-(2-methylphenyl)-2-naphthamide |
| (Cp-21) | Cp-21 |
| (Cp-22) | Cp-22 |

TABLE 2-continued

| Cp. No. | Cp |
|---|---|
| (Cp-23) | [structure: 3-hydroxy-4-methyl-N-methyl-N-phenyl-2-naphthamide] |
| (Cp-24) | [structure: 3-hydroxy-4-methyl-2-naphthoyl with (phenyl)$_2$ on N] |
| (Cp-25) | [structure: naphthalimide with OH, CH$_3$, N—CH$_3$] |
| (Cp-26) | [structure: naphthalimide with OH, CH$_3$, N-(4-chlorophenyl)] |
| (Cp-27) | [structure: naphthalimide with OH, CH$_3$, N—CH$_3$] |
| (Cp-28) | [structure: naphthalimide with OH, CH$_3$, N—C$_2$H$_5$] |
| (Cp-29) | [structure: naphthalimide with OH, CH$_3$, N-phenyl] |
| (Cp-30) | [structure: naphthalimide with OH, CH$_3$, N-(4-phenylazophenyl)] |
| (Cp-31) | [structure: 2-methyl-3-hydroxy-naphthyl-NHCO-phenyl] |
| (Cp-32) | [structure: 2-methyl-3-hydroxy-naphthyl-NHCO-(4-chlorophenyl)] |
| (Cp-33) | [structure: 3-methyl-4-methyl-5-hydroxy-1-phenylpyrazole] |
| (Cp-34) | [structure: 3-methyl-4-methyl-5-hydroxy-1-(4-chlorophenyl)pyrazole] |
| (Cp-35) | —CHCONH—(phenyl)<br>  \|<br>  COCH$_3$ |

TABLE 2-continued

| Cp. No. | Cp |
|---|---|
| (Cp-36) | —CHCONH—[naphthyl]<br>    |<br>    COCH$_3$ |

TABLE 3

| Cp | Ar | | | |
|---|---|---|---|---|
| HO—[naphthyl with CH$_3$]—CONH—Ar | Cp-37<br>[phenyl-CF$_3$ (meta)] | Cp-38<br>[phenyl-CF$_3$] | Cp-39<br>[phenyl-CF$_3$ (para)] | Cp-40<br>[phenyl-(CF$_3$)$_2$] |
| HO—[naphthyl with CH$_3$, NH-fused phenyl]—CONH—Ar | Cp-49 | Cp-50 | Cp-51 | Cp-52 |
| HO—[naphthyl with CH$_3$]—CONH—Ar | Cp-61 | Cp-62 | Cp-63 | Cp-64 |
| HO—[phenyl with CH$_3$, HN-phenyl]—CONH—Ar | Cp-73 | Cp-74 | Cp-75 | Cp-76 |

TABLE 3-continued

| Structure | | | | |
|---|---|---|---|---|
| HO–[dibenzofuran with CONH–Ar] | Cp-85 | Cp-86 | Cp-87 | Cp-88 |

| | Ar | | | |
|---|---|---|---|---|
| | 2-CF₃, 4-Cl phenyl | 2-CF₃, 5-Cl (Cl at top) phenyl | 3-CF₃, 4-Cl phenyl | 2-CF₃, 4-Br phenyl |
| HO–[naphthalene]–CONH–Ar | Cp-41 | Cp-42 | Cp-43 | Cp-44 |
| HO–[carbazole-fused naphthalene]–CONH–Ar | Cp-53 | Cp-54 | Cp-55 | Cp-56 |
| HO–[anthracene]–CONH–Ar | Cp-65 | Cp-66 | Cp-67 | Cp-68 |
| HO–[carbazole derivative]–CONH–Ar | Cp-77 | Cp-78 | Cp-79 | Cp-80 |

TABLE 3-continued
| | | Ar | | | |
|---|---|---|---|---|---|
| | | 4-Br-3-Me-<br>phenyl (CF₃ at 4? see image) | 3-Me-4-CF₃-<br>phenyl with F | 3-Me-F,CF₃<br>phenyl | 3-Me-F,CF₃<br>phenyl | 2-C₂H₅-phenyl |
| 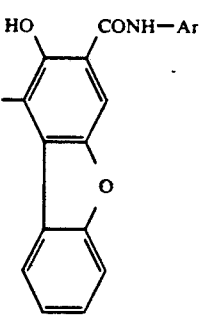 HO—CONH—Ar (chroman/dibenzofuran type) | Cp-89 | Cp-90 | Cp-91 | Cp-92 | |
| 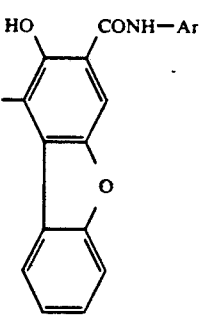 HO—CONH—Ar (3-methyl-2-hydroxynaphthamide) | Cp-45 | Cp-46 | Cp-47 | Cp-48 | Cp-97 |
| 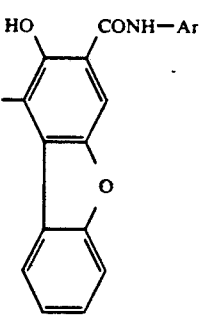 HO—CONH—Ar (carbazole-fused naphthamide) | Cp-57 | Cp-58 | Cp-59 | Cp-60 | Cp-109 |
| 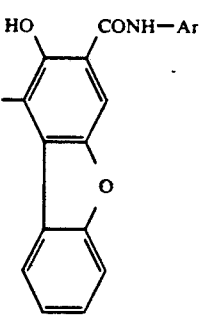 HO—CONH—Ar (anthracene-type) | Cp-69 | Cp-70 | Cp-71 | Cp-72 | Cp-121 |

TABLE 3-continued

| Coupler structure | | | | | |
|---|---|---|---|---|---|
| HO—/CONH—Ar (with methyl, carbazole-like HN fused ring system) | Cp-81 | Cp-82 | Cp-83 | Cp-84 | Cp-133 |
| HO—/CONH—Ar (with methyl, dibenzofuran-like O fused ring system) | Cp-93 | Cp-94 | Cp-95 | Cp-96 | Cp-145 |

| Ar | | | | |
|---|---|---|---|---|
| | 3-(C$_3$F$_7$)phenyl | 4,4'-azobis(phenyl) | 3,5-bis(CF$_3$)phenyl (with additional CF$_3$) | 3-NO$_2$-5-CF$_3$-phenyl |
| HO—/CONH—Ar (methylnaphthol) | Cp-98 | Cp-99 | Cp-100 | Cp-101 |
| HO—/CONH—Ar (methyl-carbazole fused naphthol, NH) | Cp-110 | Cp-111 | Cp-112 | Cp-113 |
| HO—/CONH—Ar (methylanthrol) | Cp-122 | Cp-123 | Cp-124 | Cp-125 |

TABLE 3-continued
| Structure | | | | |
|---|---|---|---|---|
| 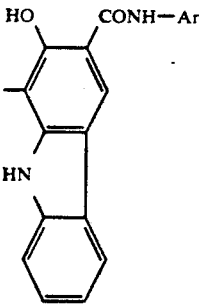 | Cp-134 | Cp-135 | Cp-136 | Cp-137 |
| 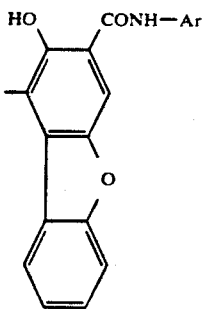 | Cp-146 | Cp-147 | Cp-148 | Cp-149 |
| Ar |
|---|
| 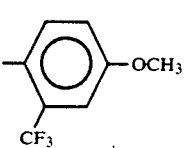 |
| Structure | | | | |
|---|---|---|---|---|
| 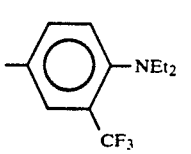 | Cp-102 | Cp-103 | Cp-104 | Cp-105 |
| 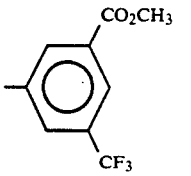 | Cp-114 | Cp-115 | Cp-116 | Cp-117 |

TABLE 3-continued
| | | | | |
|---|---|---|---|---|
| 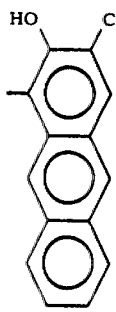 | Cp-126 | Cp-127 | Cp-128 | Cp-129 |
| 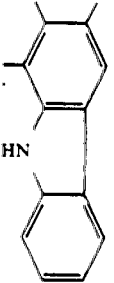 | Cp-138 | Cp-139 | Cp-140 | Cp-141 |
| 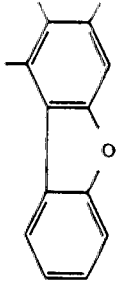 | Cp-150 | Cp-151 | Cp-152 | Cp-153 |
| | Ar | | |
|---|---|---|---|
| | 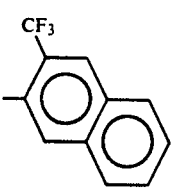 | 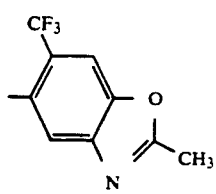 | 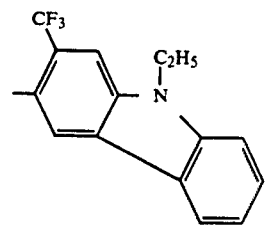 |
| 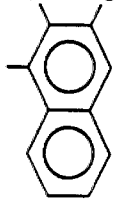 | Cp-106 | Cp-107 | Cp-108 |

TABLE 3-continued
| | Cp-118 | Cp-119 | Cp-120 |
|---|---|---|---|
| 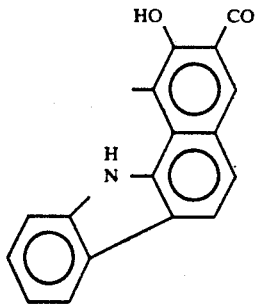 | | | |
| 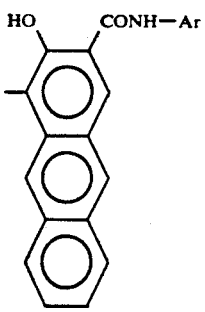 | Cp-130 | Cp-131 | Cp-132 |
| 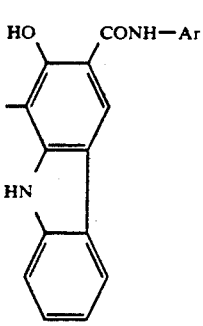 | Cp-142 | Cp-143 | Cp-144 |
| 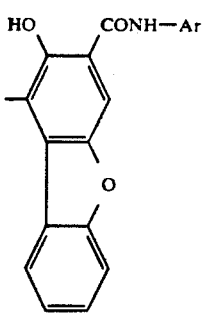 | Cp-154 | Cp-155 | Cp-156 |
TABLE 4
| Cp. No. | Cp |
|---|---|
| (Cp-157) | 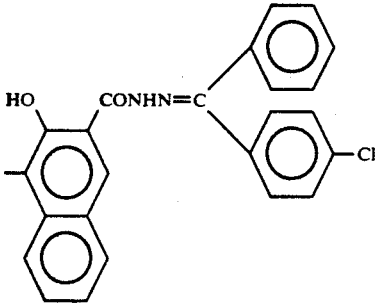 |
TABLE 4-continued
| Cp. No. | Cp |
|---|---|
| (Cp-158) | 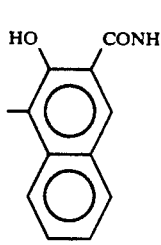 |

TABLE 4-continued
| Cp. No. | Cp |
|---|---|
| (Cp-159) | 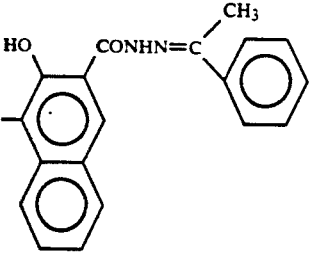 |
| (Cp-160) | 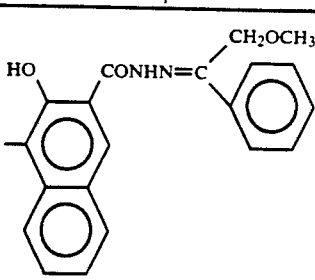 |
| (Cp-161) | 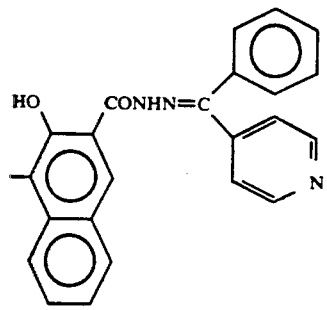 |
| (Cp-162) | 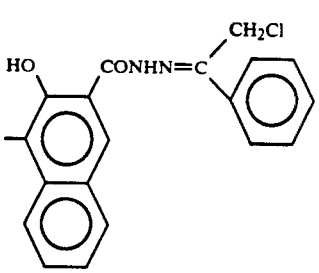 |
| (Cp-163) | 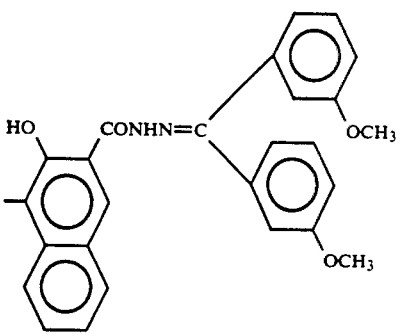 |
| (Cp-164) | 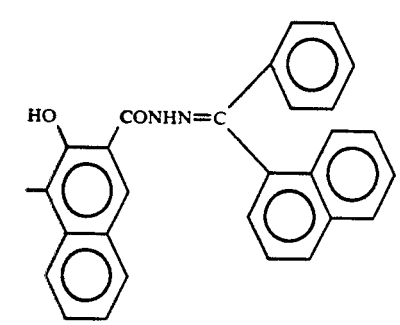 |
| (Cp-165) | 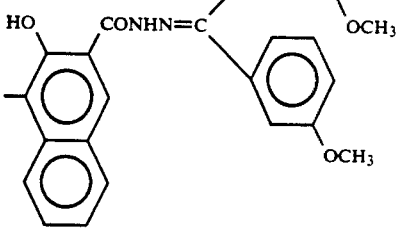 |
| (Cp-166) | 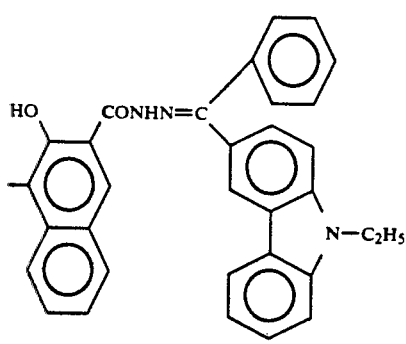 |
| (Cp-167) | 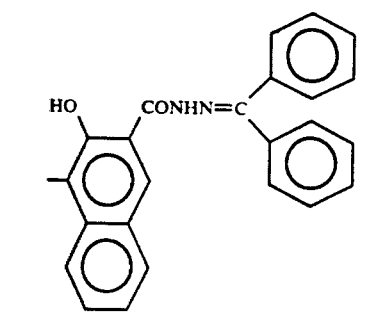 |
| (Cp-168) | 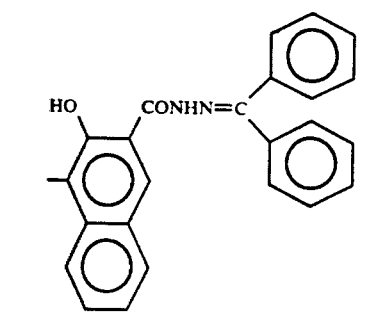 |

TABLE 4-continued
| Cp. No. | Cp |
|---|---|
| (Cp-169) | 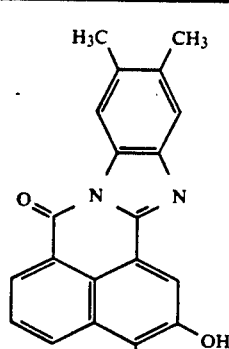 |
| (Cp-170) | 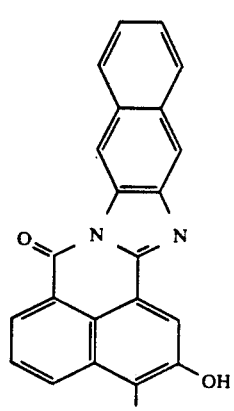 |
| (Cp-171) | 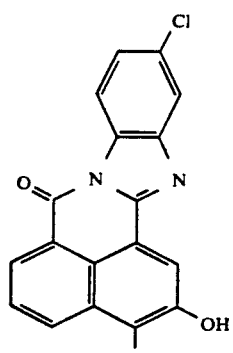 |
| (Cp-172) | 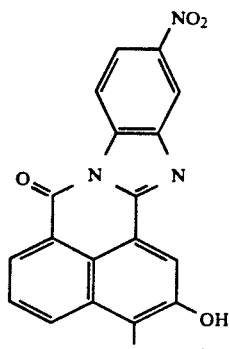 |
TABLE 4-continued
| Cp. No. | Cp |
|---|---|
| (Cp-173) | 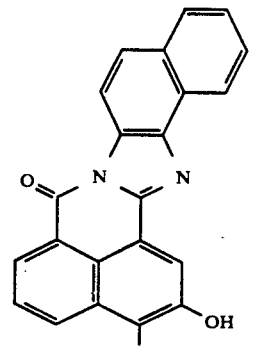 |
| (Cp-174) | 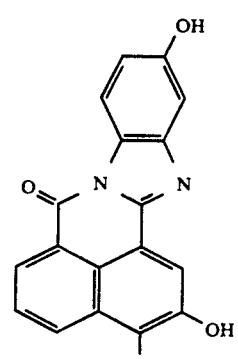 |
| (Cp-175) | 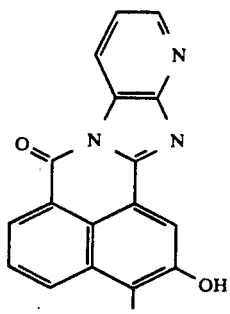 |
| (Cp-176) | 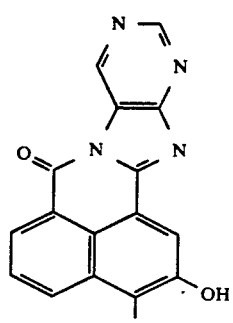 |

TABLE 4-continued
| Cp. No. | Cp |
|---|---|
| (Cp-177) | 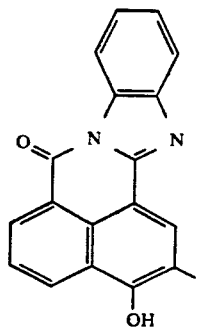 |
| (Cp-178) | |
| (Cp-179) | |
| (Cp-180) | |
| (Cp-181) | |
| (Cp-182) | |
| (Cp-183) | |
| (Cp-184) | |
The synthesis of the novel trisazo compound of the present invention can be easily accomplished by the following method. Specifically, a trisamino compound represented by the general formula (2-A) or (2-B) is allowed to undergo hexazodization in an ordinary method. The hexazonium salt is then allowed to undergo coupling with the corresponding coupler in the presence of an alkali. Alternatively, the hexazonium salt is isolated in the form of borofluoride or zinc chloride double salt, and then allowed to undergo coupling with the coupler in a solvent such as N,N-dimethylformamide and dimethylsulfoxide in the presence of an alkali.

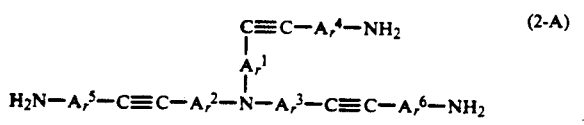

wherein $Ar^1$, $Ar^2$, $Ar^3$, $Ar^4$, $Ar^5$ and $Ar^6$ are as defined in general formula (1).

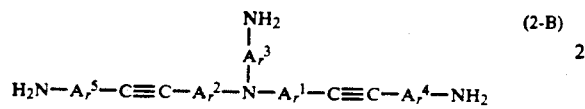

wherein $Ar^1$, $Ar^2$, $Ar^3$, $Ar^4$ and $Ar^5$ are as defined in the general formula (1).

SYNTHESIS EXAMPLE A

Synthesis of a trisazo compound of Compound Group (1) in Table 1-A wherein the coupler is (Cp-21) in Table 2

5.76 g (0.01 mmol) of a trisamino compound represented by the following structural formula (3-A) was added to dilute hydrochloric acid prepared from 25 ml of concentrated hydrochloric acid and 30 ml of water. The mixture was then stirred in a water bath of 60° C. over about 30 minutes. The mixture was then cooled to a temperature of 0° C. A solution of 2.28 g of sodium nitrite in 10 ml of water was added dropwise to the material over about 20 minutes. The mixture was then stirred at the same temperature over 1 hour. A small amount of unreacted materials were filtered out. The filtrate was then added dropwise to a solution prepared from 11.5 g (0.03 mol) of Coupler (Cp-21), 8 g of sodium acetate, 30 ml of water and 300 ml of DMF in a separate vessel with stirring while being cooled with ice. The material was stirred at room temperature over 2 hours. The resulting crystals were filtered off, and washed with water and with acetone. This process was repeated for purification. As a result, 14.9 g of black powder of the desired trisazo compound was obtained. (Yield: 85%; decomposition temperature: 270° C.)

Elementary analysis: Calculated % for $C_{114}H_{78}N_{13}O_9$: C77.19, H4.43, N10.26. Found %: C77.08, H4.52, N10.19.

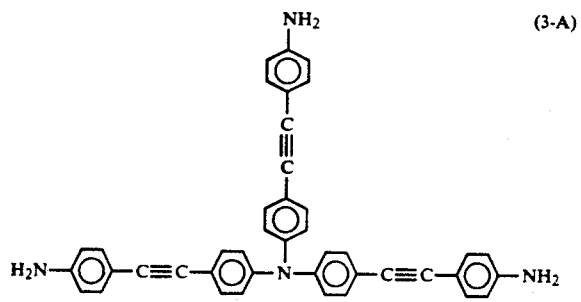

SYNTHESIS EXAMPLE B

Synthesis of a trisazo compound of Compound Group No.1 in Table 1-B wherein the coupler is (Cp-21) in Table 2

4.90 g (0.01 mmol) of a trisamino compound represented by the structural formula (3-B) was added to dilute hydrochloric acid prepared from 25 ml of concentrated hydrochloric acid and 30 ml of water. The mixture was then stirred in a water bath of 60° C. over about 30 minutes. The mixture was then cooled to a temperature of 0° C. A solution of 3.04 g of sodium nitrite in 10 ml of water was added dropwise to the material in about 20 minutes. The mixture was then stirred at the same temperature over 1 hour. A small amount of unreacted materials were filtered out. The filtrate was then added dropwise to a solution prepared from 11.5 g (0.03 mol) of Coupler (Cp'-21), 4.92 g of sodium acetate, 10 ml of water and 300 ml of DMF in a separate vessel with stirring while being cooled with ice. The material was stirred at room temperature over 2 hours. The resulting crystals were filtered off, and washed with water and with acetone. This process was repeated for purification. As a result, 13.7 g of black powder of the desired trisazo compound was obtained. (Yield: 82%; decomposition temperature: 270° C.)

Elementary analysis: Calculated % for $C_{106}H_{71}N_{13}O_9$: C76.20, H4.28, N10.90. Found %: C76.01, H4.30, N10.75.

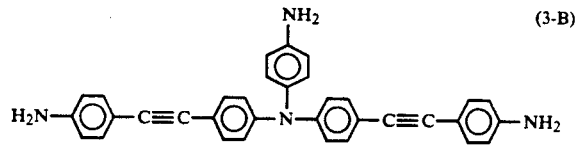

The electrophotographic photoreceptor of the present invention comprises an electrophotographic light sensitive layer containing one or more trisazo compounds represented by the general formula (1). Various forms of electrophotographic photoreceptors have been known. The electrophotographic photoreceptor of the present invention may be in any of these forms but normally has an electrophotographic photoreceptor structure of any of the following types (I), (II) and (III):

(I) Structure comprising on an electrically conductive support an electrophotographic light-sensitive layer with a trisazo compound dispersed in a binder or charge-transporting medium;

(II) Structure comprising on an electrically conductive support a charge-generating layer containing a trisazo compound as a main component and a charge-transporting layer provided thereon; and (III) Structure comprising on an electrically conductive support a charge-transporting layer and a charge-generating layer containing a trisazo compound as a main component provided thereon.

The trisazo compound of the present invention has an effect of producing a charge carrier at an extremely high efficiency upon absorption of light. The charge thus produced is transported by a charge-transporting compound.

The preparation of an electrophotographic photoreceptor of Type (I) can be accomplished by dispersing finely divided grains of a trisazo compound in a binder solution or a solution containing a charge-transporting compound and a binder solution, coating the dispersion on an electrically conductive support, and then drying the coated material. The thickness of the electrophotographic photoreceptor thus prepared may be in the range of 3 to 30 μm, preferably 5 to 20 μm.

The preparation of an electrophotographic photoreceptor of Type (II) can be accomplished by vacuum-depositing a trisazo compound on an electrically conductive support to form a charge-generating layer thereon or by dispersing finely divided grains of a trisazo compound in a proper solvent containing a binder resin, coating the dispersion on a support, drying the coated material to form a charge-generating layer thereon, and then optionally finishing the surface of the layer by a proper process such as buffing or otherwise adjusting the thickness of the film, coating a solution containing a charge-transporting substance and a binder resin thereon, and drying the coated material. The thickness of the charge-generating layer thus prepared may be in the range of 0.01 to 4 μm, preferably 0.1 to 2 μm. The thickness of the charge-transporting layer may be in the range of 3 to 30 μm, 5 to 20 μm.

The preparation of an electrophotographic photoreceptor of Type (III) can be accomplished by reversing the order of lamination of the electrophotographic photoreceptor of Type (II).

The trisazo compound to be incorporated in the light-sensitive material of Types (I), (II) and (III) is subjected to dispersion in a dispersion apparatus such as ball mill, sand mill and oscillating mill to an average grain diameter of 0.1 to 2 μm, preferably 0.3 to 2 μm before use.

If the amount of the trisazo compound to be incorporated in the electrophotographic photoreceptor of Type (I) is too small, the photoreceptor thus obtained exhibits a poor sensitivity. On the contrary, if the amount of the trisazo compound to be incorporated in the electrophotographic photoreceptor is too large, the photoreceptor thus obtained exhibits a poor chargeability and a poor film strength in the electrophotographic light-sensitive layer. The weight proportion of the trisazo compound in the electrophotographic light-sensitive layer, if a binder is incorporated therein, may be in the range of 0.01 to 2 times, preferably 0.05 to 1 times that of the binder. The weight proportion of the charge-transporting compound may be in the range of 0.1 to 2 times, preferably 0.3 to 1.5 times that of the binder. In the case of a charge-transporting compound which can be used as a binder itself, the amount of the trisazo compound to be incorporated is preferably in the range of 0.01 to 0.5 times that of the charge-transporting compound.

In the case where an trisazo compound-containing layer is coated as a charge-generating compound-containing layer in the preparation of an electrophotographic photoreceptor of Type (II) or (III), the amount of the trisazo compound to be incorporated is preferably in the range of 0.1 or more times that of the binder. If the value is less than this range, a sufficient sensitivity cannot be obtained. Such a trisazo compound can also be used in the absence of a binder. The weight proportion of the charge-transporting compound to be incorporated in the charge-transporting compound-containing layer may be in the range of 0.2 to 2 times, preferably 0.3 to 1.5 times that of the binder. In the case where a high molecular charge-transporting compound which can be used as a binder itself is employed, such a compound can be used in the absence of any other binders.

Examples of an electrically conductive support to be incorporated in the present electrophotographic photoreceptor include plate of metal such as aluminum, copper and zinc, material comprising a sheet or film of plastic such as polyester with an electrically conductive material such as aluminum, indium oxide, tin oxide and copper iodide vacuum-evaporated or dispersion-coated thereon, and paper treated with an inorganic salt such as sodium chloride and calcium chloride or an organic quaternary ammonium salt.

If a binder is used, as such a binder there may be preferably used a hydrophobic high dielectric electrically insulating film-forming high molecular polymer. Specific examples of such a high molecular polymer will be set forth below, but the present invention should not be construed as being limited thereto.

Polycarbonate, polyester, polyester carbonate, polysulfone, methacrylic resin, acrylic resin, polyvinyl chloride, polyvinylidene chloride, polystyrene, polyvinyl acetate, styrene-butadiene copolymer, vinylidene chloride-acrylonitrile copolymer, vinyl chloride-vinyl acetate copolymer, vinyl chloride-vinyl acetate-maleic anhydride copolymer, silicone resin, silicone-alkyd resin, phenol-formaldehyde resin, styrene-alkyd resin, styrene-maleic anhydride copolymer, phenoxy resin, polyvinylbutyral resin, poly-N-vinylcarbazole.

These resin binders can be used singly or in admixture.

In the present photoreceptor, a plasticizer can be used in admixture with a resin binder.

Examples of such a plasticizer which can be used in the present invention include biphenyl, biphenyl chloride, o-terphenyl, p-terphenyl, dibutyl phthalate, dimethyl glycol phthalate, dioctyl phthalate, triphenylphosphoric acid, chlorinated paraffin, and dilauryl thiodipropionate.

In the preparation of the present electrophotographic photoreceptor, an additive such as sensitizer may be incorporated in the light-sensitive layer.

Examples of such a sensitizer include triallyl methane dye such as Brilliant Green, Victorian Blue B, Methyl Violet, Crystal Violet and Acid Violet 6B, xanthene dye such as Rhodamine B, Rhodamine 6G, Rhodamine G Extra, Eosine S, Erythrosine, Rose Bengal and Fluoresceine, thiazine dye such as Methylene Blue, astrazone dye such as C.I. Basic. Violet 7 (e.g., C.I. 48020), cyanine dye, and pyrilium dye such as 2,6-diphenyl-4-(N,N-dimethylaminophenyl)thiapyrilium perchlorate and benzopyrilium salt (as described in JP-B-48-25658).

In order to improve the surface characteristics of the electrophotographic photoreceptor, a silicone oil, fluorine surface active agent or the like may be used.

Charge-transporting substances to be incorporated in the charge-transporting layer of the present invention can be classified into two kinds of compounds: compounds which transport electrons and compound which transports positive holes. The electrophotographic photoreceptor of the present invention can comprise either of the two types of compounds.

As such a compound which transports electrons there can be used a compound containing an electron attractive group. Examples of such a compound include 2,4,7-trinitro-9-fluorenone, 2,4,5,7-tetranitro-9-fluorenone, 9-dicyanomethylene-2,4,7-trinitrofluorenone, 9-dicyanomethylene-2,4,5,7-tetranitrofluorenone, tetranitrocarbazole, chloranil, 2,3-dichloro-5,6-dicyanobenzoquinone, 2,4,7-trinitro-9,10-phenanthrenequinone, tetrachlorophthalic anhydride, tetracyanoethylene, and tetracyanoquinodimethane.

As such a compound which transports positive holes there can be used a compound containing an electron-donating group.

Examples of such a compound having a high molecular weight include:

(a) Polyvinyl carbazoles and derivatives thereof as described in JP-B-34-10966;

(b) Vinyl polymers as described in JP-B-43-18674 and JP-B-43-19192 such as polyvinyl pyrene, polyvinyl anthracene, poly-2-vinyl-4-(4'-dimethylaminophenyl)-5-phenyloxazole and poly-3-vinyl-N-ethylcarbazole;

(c) Polymers as described in JP-B-43-19193 such as copolymers of styrene with polyacenaphthylene, polyindene or acenaphthylene;

(d) Condensed resins as described in JP-B-56-13940 such as pyrene-formaldehyde resin, bromopyrene-formaldehyde resin and ethylcarbazole-formaldehyde resin; and (e) Various triphenylmethane polymers as described in JP-A-56-90883 and JP-A-56-161550.

Examples of such a compound having a low molecular weight include:

(f) Triazole derivatives as described in U.S. Pat. No. 3,112,197;

(g) Oxadiazole derivatives as described in U.S. Pat. No. 3,189,447;

(h) Imidazole derivatives as described in JP-B-37-16096;

(i) Polyarylalkane derivatives as described in U.S. Pat. Nos. 3,615,402, 3,820,989 and 3,542,544, JP-B-45-555 and JP-B-51-10983, and JP-A-51-93224, JP-A-55-108667, JP-A-55-156953, and JP-A-56-36656;

(j) Pyrazoline derivatives and pyrazolone derivatives as described in U.S. Pat. Nos. 3,180,729 and 4,278,746, and JP-A-55-88064, JP-A-55-88065, JP-A-49-105537, JP-A-55-51086, JP-A-56-80051, JP-A-56-88141, JP-A-57-45545, JP-A-54-112637 and JP-A-55-74546;

(k) Phenylenediamine derivatives as described in U.S. Pat. No. 3,615,404, JP-B-51-10105, JP-B-46-3712 and JP-B-47-28336, and JP-A-54-83435, JP-A-54-110836 and JP-A-54-119925;

(l) Arylamine derivatives as described in U.S. Pat. Nos. 3,567,450, 3,180,703, 3,240,597, 3,658,520, 4,232,103, 4,175,961 and 4,012,376, West German Patent (DAS) 1,110,518, JP-B-49-35702 and JP-B-39-27577, and JP-A-55-144250, JP-A-56-119132, and JP-A-56-22437;

(m) Amino-substituted chalcone derivatives as described in U.S. Pat. No. 3,526,501;

(n) N,N-bicarbazyl derivatives as described in U.S. Pat. No. 3,542,546;

(o) Oxazole derivatives as described in U.S. Pat. No. 3,257,203;

(p) Styrylanthracene derivatives as described in JP-A-56-46234;

(q) Fluorenone derivatives as described in JP-A-54-110837;

(r) Hydrazone derivatives as described in U.S. Pat. No. 3,717,462, and JP-A-54-59143 (U.S. Pat. No. 4,150,987), JP-A-55-52063, JP-A-55-52064, JP-A-55-46760, JP-A-55-85495, JP-A-57-11350, JP-A-57-148749 and JP-A-57-104144;

(s) Benzidine derivatives as described in U.S. Pat. Nos. 4,047,948, 4,047,949, 4,265,990, 4,273,846, 4,299,897 and 4,306,008; and (t) Stilbene derivatives as described in JP-A-58-190953, JP-A-59-95540, JP-A-59-97148, JP-A-59-195658 and JP-A-62-36674.

In the present invention, the charge-transporting compounds should not be construed as being limited to those belonging to the compound groups (a) to (t). All charge-transporting compounds which have heretofore been known can be used.

In the preparation of the present electrophotographic photoreceptor, a charge-transporting compound may be incorporated in the charge-generating layer.

In the present electrophotographic photoreceptor, an adhesive layer or barrier layer can be optionally provided between the electrically conductive support and the light-sensitive layer. As examples of materials to be incorporated in these layers there can be used polymers which can be the same as the above described binder. Other examples of materials to be incorporated in these layers include gelatin, casein, polyvinyl alcohol, ethyl cellulose, carboxymethyl cellulose, vinylidene chloride polymer latexes as described in JP-A-59-84247, styrene-butadiene polymer latexes as described in JP-A-59-114544, and aluminum oxide. The thickness of these layers is preferably in the range of 1 μm or less.

The electrophotographic photoreceptor thus obtained can be treated properly so as to protect itself from an interference band produced when an interfering light such as laser is used for exposure. There have been proposed many such treatment methods. For example, JP-A-60-186850 proposes the provision of an undercoating layer having a light scattering surface. JP-A-60-184258 proposes the provision of a titanium black-containing undercoating layer. JP-A-58-82249 proposes the absorption of a major part of light to be used in a charge-generating layer. JP-A-61-18963 proposes that a charge-transporting layer have a microphase separating structure. JP-A-60-86550 proposes the incorporation of a substance which absorbs or scatters an interfering light in a photoconductive layer. JP-A-63-106757 proposes the provision of an indentation having a depth of one-fourth of the wavelength of an interfering light on the surface of a photoreceptor. JP-A-62-172371 and JP-A-62-174771 proposes the provision of a light-scattering layer or light-absorbing layer on the back surface of a transparent support.

The present electrophotographic photoreceptor has been described in detail. The present electrophotographic photoreceptor generally exhibits a high sensitivity and a small change in the electrophotographic properties after repeated use.

The present electrophotographic photoreceptor can be widely used in electrophotographic copying machines as well as in the field of light-sensitive materials for printers using laser, CRT, LED or the like as light source.

A photoconductive composition containing the present trisazo compound can be used as a photo-conductive layer in the pickup tube for video camera or as a photoconductive layer having a light-receiving layer (photoconductive layer) in a solid-state imaging device provided on the entire surface of one-dimensionally or two-dimensionally arranged semiconductor circuit for signal transfer or scanning. As described in A. K. Ghosh, Tom Feng, J. Appl. Phys., 49 (12), 6982 (1978), such a photoconductive composition can also be used as a photoconductive layer for solar cell.

The present trisazo compound can further be used as photoconductive colored grains in photoelectrophoresis system or colored grains of dry or wet process electrophotographic developer.

As disclosed in JP-B-37-17162, and JP-A-55-19063, JP-A-55-161250 and JP-A-57-147656, a high resolution, durability and sensitivity printing plate and printed circuit can be prepared by dispersing the present trisazo compound in an alkali-soluble resin such as phenol resin together with the above-described charge-transporting compound such as an oxadiazole derivative and hydrazone derivative, coating the dispersion on an electrically conductive support such as aluminum, drying the coated material, exposing imagewise the material to light, subjecting the material to toner development, and then etching the material with an aqueous solution of an alkali.

The present invention will be further described in the following examples, but the present invention should not be construed as being limited thereto. Unless otherwise indicated, all parts are by weight.

EXAMPLE 1

5 parts by weight of a trisazo compound belonging to Compound Group No. 1 in Table 1-A wherein Cp is (Cp-21) in Table 2 and 5 parts by weight of a polyester resin (Vylon; Toyobo Co., Ltd.) were added to 50 parts by weight of tetrahydrofuran. The mixture was then subjected to dispersion in a ball mill over 12 hours. The dispersion was then coated on an electrically conductive support (Toray Industries Inc.'s Metalme 75TS; 75-μm polyethyleneterephthalate support having an aluminum-deposited film thereon) by means of a wire round rod, and dried to obtain a charge-generating layer having a thickness of about 0.5 μm.

A solution obtained by mixing 3.6 parts by weight of p-(diphenylamino)benzaldehyde-N'-methyl-N'-phenylhydrazone of the general formula:

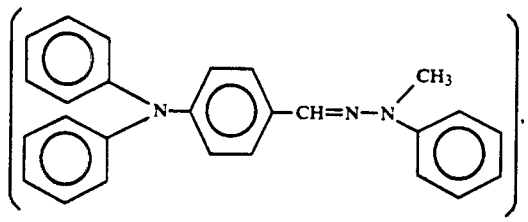

4 parts by weight of a polycarbonate resin (Panlite K-1300; Teijin Limited), 13.3 parts by weight of dichloromethane and 26.6 parts by weight of 1,2-dichloroethane was coated on the electric charge-generating layer by means of an applicator to form a 17-μm thick charge-transporting layer thereon. Thus, an electrophotographic photoreceptor comprising a light-sensitive layer consisting of two layers was prepared.

The electrophotographic photoreceptors thus prepared was then evaluated for electrophotographic properties in a static process by means of a static copying paper tester (Kawaguchi Denki Seisakusho K.K.'s Model SP-428). Specifically, the photoreceptor was first measured for initial surface potential Vs developed shortly after being corona-charged (−6 kv) and surface potential Vo left after being stored in a dark place for 30 seconds. The photoreceptor was then exposed to light from a tungsten lamp in such a manner that the illuminance on the surface of the photoreceptor reached 3 lux. The photoreceptor was then measured for exposure $E_{50}$ such that the surface potential before exposure is attenuated to half the initial surface potential Vo, and for surface potential left 30 seconds after exposure (residual potential $V_R$). This measurement process was repeated 3,000 times. The results are set forth in Table 5.

TABLE 5

|  | $E_{50}$ (Lux·sec) | Vs (−V) | Vo (−V) | $V_R$ (−V) |
|---|---|---|---|---|
| 1st time | 1.3 | 970 | 860 | 0 |
| 3000th time | 1.3 | 930 | 810 | 0 |

EXAMPLES 2 TO 25

Two-layer electrophotographic photoreceptors were prepared in the same manner as in Example 1 except that the trisazo compound was replaced by those set forth in Table 6. These specimens were then measured for $E_{50}$, $V_s$, $V_o$ and $V_R$ in the same manner as in Example 1. The results are set forth in Table 6.

TABLE 6

| Example No. | Trisazo Compound *Compound Group No. | Cp No. | 1st Time $E_{50}$ (lux·sec) | Vs (−V) | Vo (−V) | $V_R$ (−V) | 3000th Time $E_{50}$ (lux·sec) | Vs (−V) | Vo (−V) | $V_R$ (−V) |
|---|---|---|---|---|---|---|---|---|---|---|
| 2 | 1 | 1 | 1.5 | 940 | 840 | 0 | 1.6 | 890 | 800 | 1 |
| 3 | 1 | 10 | 1.4 | 940 | 800 | 0 | 1.4 | 880 | 760 | 0 |
| 4 | 1 | 22 | 1.4 | 950 | 830 | 0 | 1.4 | 880 | 770 | 0 |
| 5 | 1 | 51 | 1.3 | 920 | 810 | 0 | 1.3 | 860 | 740 | 0 |
| 6 | 1 | 56 | 1.2 | 920 | 800 | 0 | 1.2 | 850 | 740 | 0 |
| 7 | 2 | 8 | 1.6 | 960 | 820 | 0 | 1.7 | 880 | 750 | 0 |
| 8 | 2 | 12 | 1.7 | 970 | 840 | 0 | 1.7 | 900 | 780 | 0 |
| 9 | 2 | 21 | 1.6 | 930 | 800 | 0 | 1.6 | 860 | 740 | 0 |
| 10 | 3 | 2 | 1.7 | 900 | 805 | 0 | 1.8 | 830 | 740 | 2 |
| 11 | 3 | 21 | 1.6 | 980 | 860 | 0 | 1.6 | 920 | 820 | 0 |
| 12 | 4 | 18 | 1.6 | 930 | 850 | 0 | 1.7 | 910 | 845 | 2 |
| 13 | 4 | 22 | 1.5 | 920 | 810 | 0 | 1.5 | 870 | 775 | 0 |
| 14 | 5 | 7 | 1.2 | 910 | 800 | 0 | 1.2 | 870 | 770 | 0 |
| 15 | 5 | 50 | 1.3 | 920 | 820 | 0 | 1.3 | 850 | 770 | 0 |
| 16 | 6 | 39 | 1.5 | 930 | 850 | 0 | 1.5 | 900 | 840 | 1 |
| 17 | 6 | 51 | 1.6 | 900 | 805 | 0 | 1.7 | 870 | 760 | 1 |
| 18 | 7 | 17 | 1.8 | 990 | 850 | 0 | 1.8 | 930 | 760 | 1 |
| 19 | 9 | 1 | 1.7 | 930 | 800 | 0 | 1.7 | 880 | 710 | 0 |
| 20 | 9 | 21 | 1.0 | 920 | 780 | 0 | 1.0 | 880 | 770 | 0 |
| 21 | 9 | 55 | 1.2 | 920 | 810 | 0 | 1.2 | 860 | 740 | 0 |
| 22 | 10 | 21 | 1.3 | 920 | 800 | 0 | 1.3 | 890 | 780 | 0 |
| 23 | 11 | 10 | 1.6 | 980 | 840 | 0 | 1.7 | 960 | 855 | 2 |
| 24 | 11 | 22 | 1.5 | 910 | 800 | 0 | 1.5 | 830 | 730 | 0 |

TABLE 6-continued

| Example No. | Trisazo Compound | | 1st Time | | | | 3000th Time | | | |
|---|---|---|---|---|---|---|---|---|---|---|
| | *Compound Group No. | Cp No. | $E_{50}$ (lux·sec) | $V_s$ (−V) | $V_o$ (−V) | $V_R$ (−V) | $E_{50}$ (lux·sec) | $V_s$ (−V) | $V_o$ (−V) | $V_R$ (−V) |
| 25 | 13 | 39 | 1.8 | 990 | 830 | 0 | 1.9 | 960 | 830 | 3 |

*Compound Group No. in Table 1-A

EXAMPLE 26

5 parts by weight of a trisazo compound belonging to Compound Group No. 1 in Table 1-A wherein Cp is (Cp-21), 40 parts by weight of the same hydrazone compound as used in Example 1 and 100 parts of a copolymer of benzyl methacrylate and methacrylic acid ([η] 30° C. in methyl ethyl ketone: 0.12; methacrylic acid content: 32.9%) were added to 660 parts by weight of dichloromethane. The mixture was then subjected to dispersion in a ball mill over 12 hours. The dispersion was then coated on a 0.25-mm thick grained aluminum plate, and dried to prepare an electrophotographic printing plate material comprising a 6-μm thick electrophotographic light-sensitive layer.

The specimen was then subjected to corona discharge at +6 KV in a dark place so that the light-sensitive layer was charged at a surface potential of +500 V. The specimen was then exposed to light from a tungsten lamp with a color temperature of 2,854° K. in such a manner that the illuminance on the surface of the specimen reached 2.0 lux. As a result, the specimen exhibited a half reduction exposure $E_{50}$ of 2.0 lux·sec.

The specimen was then charged at a surface potential of +500 V in a dark place. The specimen was then imagewise exposed to light with a transparent original of positive image brought into close contact thereto. The specimen was then immersed in a liquid developer comprising 1 g of Isopar H (petroleum solvent produced by Esso Standard), 5 g of finely dispersed polymethyl methacrylate (toner) and 0.01 g of soybean oil lecithin. As a result, a sharp positive toner image can be obtained.

The specimen was then heated to a temperature of 100° C. over 30 seconds to fix the toner image. The printing plate material was immersed in an etching solution obtained by dissolving 70 g of sodium metasilicate hydrate in 140 ml of glycerin, 550 ml of ethylene glycol and 150 ml of ethanol over 1 minute. The printing plate material was washed in a water flow with light brushing to remove the light-sensitive layer on the portion free of the toner. Thus, the desired printing plate was obtained.

The printing plate thus prepared was then used for printing by means of Hamada Star 600 CD Offset Printer. As a result, 50,000 sheets of extremely sharp printed matters free of any stain on the background were obtained.

EXAMPLE 27

An electrophotographic photoreceptor specimen was prepared in the same manner as in Example 1 except that the trisazo compound was replaced by a trisazo compound of Compound Group No. 1 in Table 1-B wherein the coupler is (Cp-21) in Table 2. The specimen was then measured for $E_{50}$, $V_s$, $V_o$ and $V_R$ in the same manner as in Example 1. The results are set forth in Table 7.

TABLE 7

| | $E_{50}$ (Lux·sec) | $V_s$ (−V) | $V_o$ (−V) | $V_R$ (−V) |
|---|---|---|---|---|
| 1st time | 0.9 | 1010 | 720 | 0 |
| 3000th time | 1.0 | 980 | 700 | 10 |

EXAMPLES 28 TO 51

Electrophotographic photoreceptor specimens were prepared in the same manner as in Example 27 except that the trisazo compound was replaced by a trisazo compounds set forth in Table 8. These specimens were then measured for $E_{50}$, $V_s$, $V_o$ and $V_R$ in the same manner as in Example 1. The results are set forth in Table 8.

TABLE 8

| Example No. | Trisazo Compound | | 1st Time | | | | 3000th Time | | | |
|---|---|---|---|---|---|---|---|---|---|---|
| | *Compound Group No. | Cp No. | $E_{50}$ (lux·sec) | $V_s$ (−V) | $V_o$ (−V) | $V_R$ (−V) | $E_{50}$ (lux·sec) | $V_s$ (−V) | $V_o$ (−V) | $V_R$ (−V) |
| 28 | 1 | 1 | 1.2 | 980 | 770 | 10 | 1.5 | 990 | 750 | 20 |
| 29 | 1 | 3 | 1.6 | 1080 | 800 | 0 | 1.6 | 1070 | 790 | 10 |
| 30 | 1 | 41 | 1.3 | 920 | 720 | 10 | 1.4 | 900 | 690 | 40 |
| 31 | 1 | 51 | 1.0 | 950 | 690 | 0 | 1.0 | 960 | 700 | 0 |
| 32 | 4 | 1 | 1.2 | 890 | 680 | 30 | 1.4 | 920 | 670 | 30 |
| 33 | 4 | 41 | 1.1 | 1110 | 800 | 0 | 1.7 | 1070 | 810 | 10 |
| 34 | 4 | 51 | 0.9 | 1090 | 790 | 0 | 1.1 | 1040 | 770 | 0 |
| 35 | 4 | 102 | 1.3 | 970 | 680 | 0 | 1.5 | 900 | 670 | 0 |
| 36 | 4 | 163 | 1.8 | 1000 | 700 | 0 | 1.7 | 950 | 690 | 10 |
| 37 | 5 | 1 | 1.3 | 990 | 670 | 20 | 1.7 | 910 | 650 | 30 |
| 38 | 5 | 21 | 1.5 | 1050 | 710 | 0 | 1.4 | 1020 | 700 | 0 |
| 39 | 5 | 22 | 1.7 | 960 | 650 | 0 | 1.9 | 940 | 640 | 0 |
| 40 | 5 | 53 | 1.1 | 980 | 800 | 50 | 1.5 | 950 | 770 | 70 |
| 41 | 5 | 157 | 2.0 | 1020 | 650 | 40 | 1.9 | 990 | 640 | 50 |
| 42 | 8 | 21 | 1.5 | 900 | 590 | 0 | 1.5 | 920 | 600 | 0 |
| 43 | 8 | 65 | 1.9 | 880 | 540 | 10 | 1.7 | 850 | 530 | 20 |
| 44 | 8 | 169 | 2.1 | 1060 | 630 | 10 | 2.0 | 1020 | 620 | 20 |
| 45 | 11 | 21 | 1.4 | 1010 | 700 | 0 | 1.6 | 1040 | 680 | 0 |
| 46 | 12 | 21 | 1.7 | 1100 | 710 | 0 | 1.8 | 1090 | 720 | 0 |
| 47 | 13 | 21 | 1.1 | 1030 | 660 | 0 | 1.3 | 1000 | 640 | 10 |
| 48 | 14 | 21 | 1.8 | 990 | 580 | 0 | 2.0 | 970 | 550 | 0 |
| 49 | 15 | 21 | 1.5 | 920 | 600 | 0 | 1.6 | 920 | 600 | 0 |
| 50 | 16 | 21 | 1.0 | 1200 | 820 | 0 | 1.2 | 1190 | 830 | 0 |

TABLE 8-continued

| Example No. | Trisazo Compound | | 1st Time | | | | 3000th Time | | | |
|---|---|---|---|---|---|---|---|---|---|---|
| | *Compound Group No. | Cp No. | $E_{50}$ (lux · sec) | $V_s$ (−V) | $V_o$ (−V) | $V_R$ (−V) | $E_{50}$ (lux · sec) | $V_s$ (−V) | $V_o$ (−V) | $V_R$ (−V) |
| 51 | 17 | 21 | 1.0 | 1100 | 760 | 0 | 1.1 | 1010 | 740 | 20 |

*Compound Group No. in Table 1-B

EXAMPLE 52

The electrophotographic photoreceptor prepared in Example 27 was irradiated with light of 1 μm J/cm² and 780 nm in a manochrometer, and then measured for $V_o$ and $E_{50}$ in the same manner as in Example 1. The results were as follows:

$V_o = -730$ V
$E_{50} = 0.7$ μJ/cm²

EXAMPLES 53 TO 61

Electrophotographic photoreceptor specimens were prepared in the same manner as in Example 27 except that the trisazo compound was replaced by those used in Examples 38, 42, 45, 46, 47, 48, 49, 50 and 51, respectively, and then measured for $V_o$ and $E_{50}$ in the same manner as in Example 52. The results are set forth in Table 9.

TABLE 9

| Example No. | Trisazo Compound | | $V_o$ (−V) | $E_{50}$ (μJ/cm²) |
|---|---|---|---|---|
| | *Compound No. | Cp No. | | |
| 53 | 5 | 21 | 700 | 0.9 |
| 54 | 8 | 21 | 580 | 1.1 |
| 55 | 11 | 21 | 710 | 1.0 |
| 56 | 12 | 21 | 710 | 1.4 |
| 57 | 13 | 21 | 660 | 0.8 |
| 58 | 14 | 21 | 570 | 1.5 |
| 59 | 15 | 21 | 610 | 1.1 |
| 60 | 16 | 21 | 800 | 0.8 |
| 61 | 17 | 21 | 760 | 0.7 |

*Compound No. in Table 1-B

The results show that the present electrophotographic photoreceptors have a sufficiently high sensitivity to near infrared light and thus can be used for semiconducting laser printers.

EXAMPLE 62

A solution obtained by dissolving 7.5 parts by weight of the hydrazone compound as used in Example 27 and 10 parts by weight of polycarbonate of bisphenol A in 50 parts by weight of dichloromethane was coated on an electrically conductive polyethyleneterephthalate support having an aluminum-deposited film thereon by means of a wire round rod, and dried to obtain a charge-transporting layer having a thickness of about 12 μm.

2 parts by weight of the trisazo compound as used in Example 1 and a solution obtained by dissolving 2 parts by weight of polyester resin (Vylon; available from Toyobo Co., Ltd.) in 5 parts by weight of chlorobenzenene were together subjected to dispersion in a paint shaker over 1 hour. The dispersion was coated on the electric charge-transporting layer by means of a wire round rod, and dried to form a 1-μm thick charge-generating layer thereon. Thus, an electrophotographic photoreceptor for positive static electrification comprising an electrophotographic light-sensitive layer consisting of two layers was prepared.

The electrophotographic photoreceptor thus prepared was then measured for electrophotographic properties by means of a static copying paper tester (Kawaguchi Denki Seisakusho K.K.'s Model SP-428). Specifically, the photoreceptor was first measured for initial surface potential $V_o$ developed shortly after being positively charged by corona discharge (6 kv). The photoreceptor was then irradiated with light from a tungsten lamp in such a manner that the illuminance on the surface of the photoreceptor reached 1 lux. The photoreceptor was then measured for exposure $E_{50}$ such that the surface potential before exposure is attenuated to half the initial surface potential $V_o$. This measurement process was repeated 3,000 times. The results are set forth in Table 10.

TABLE 10

| | 1st Time | 3000th Time |
|---|---|---|
| $V_o$ [V] | 830 | 860 |
| $E_{50}$[lux · sec] | 1.3 | 1.3 |

The results show that the present photoreceptors can also exhibit a high sensitivity and excellent durability when used for positive static electrification.

EXAMPLE 63

5 parts by weight of the same trisazo compound as used in Example 27, 40 parts by weight of the same hydrazone compound as used in Example 27 and 100 parts of the same copolymer of benzyl methacrylate and methacrylic acid ([η]) 30° C. in methyl ethyl ketone: 0.12; methacrylic acid content: 32.9%) as used in Example 27 were added to 660 parts by weight of dichloromethane. The mixture was then subjected to dispersion in a ball mill over 12 hours. The dispersion was then coated on a 0.25-mm thick grained aluminum plate, and dried to prepare an electrophotographic printing plate material comprising a 6-μm thick electrophotographic light-sensitive layer.

The specimen was then subjected to corona discharge at +6KV in a dark place so that the light-sensitive layer was charged at a surface potential of +500V. The specimen was then exposed to light from a tungsten lamp with a color temperature of 2,854° K. in such a manner that the illuminance on the surface of the specimen reached 2.0 lux. As a result, the specimen was found to have exhibited a half reduction exposure $E_{50}$ of 2.0 lux·sec.

The specimen was then charged at a surface potential of +500V in a dark place. The specimen was then imagewise exposed to light with a transparent original of positive image brought into close contact thereto. The specimen was then immersed in a liquid developer comprising 5 g of polymethyl methacrylate (toner) and 0.01 g of soybean oil licithin finely dispersed in 1,000 parts by weight of Isopar H (petroleum solvent produced by Esso Standard). As a result, a sharp positive toner image can be obtained.

The specimen was then heated to a temperature of 100° C. over 30 seconds to fix the toner image. The printing plate material was immersed in an etching solution obtained by dissolving 70 g of sodium metasilicate hydrate in 140 parts by weight of glycerin, 550 parts by weight of ethylene glycol and 150 parts by weight of ethanol over 1 minute. The printing plate material was washed in a water flow with light brushing to remove the light-sensitive layer on the portion free of the toner. Thus, the desired printing plate was obtained.

In another process, the static latent image thus obtained was developed under a magnetic brush with Xerox 3500 Toner (available from Fuji Xerox Co., Ltd.) instead of the liquid developer, heated to a temperature of 80° C. over 30 seconds, and then fixed. The material was then washed with an alkaline solution to remove the light-sensitive layer on the portion free of the toner. Thus, the desired printing plate was obtained.

The printing plates thus prepared were then used for printing by means of Hamada Star 600 CD Offset Printer. As a result, 50,000 sheets of extremely sharp printed matters free of any stain on the background were obtained.

As has been described, the present novel electrophotographic photoreceptors can attain excellent sensitivity and durability and exhibit an extremely small drop in the sensitivity upon repeated use for both positive and negative static electrification. It can be also seen that the present novel electrophotographic photoreceptors can exhibit a sufficiently high sensitivity for photoreceptors for semiconducting laser.

While the invention has been described in detail and with reference to specific embodiments thereof, it will be apparent to one skilled in the art that various changes and modifications can be made therein without departing from the spirit and scope thereof.

What is claimed is:

1. An electrophotographic photoreceptor comprising on an electrically conductive support a layer containing a charge-transporting compound and a charge-generating compound or a charge-transporting compound-containing layer and a charge-generating compound-containing layer, wherein said charge-generating compound is a trisazo compound represented by formula (1):

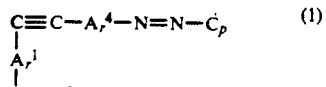

wherein $Ar_1$, $Ar_2$, $Ar_3$, $Ar_4$, $Ar_5$ and $Ar_6$ each represents an arylene group, divalent condensed polycyclic aromatic group or divalent group derived from a monocyclic or condensed polycyclic heterocyclic aromatic group, each of which may have one or more substituents; $C_p$ represents a coupler residual group; and n represents 0 or 1.

2. An electrophotographic photoreceptor as in claim 1, wherein $Ar_1$, $Ar_2$, $Ar_3$, $Ar_4$, $Ar_5$ and $Ar_6$ each represents a member selected from the group consisting of phenylene, naphthylene, antolylene, biphenylene, terphenylene, indene, fluorene, acenaphthene, perylene, fluorenone, anthrone, isocoumarin, pyridine, quinoline, oxazole, thiazole, oxadiazole, benzoxazle, benzoimidazole, benzothioazole, benzotriazole, dibenzofuran, carbazole and xanthene.

3. An electrophotographic photoreceptor as in claim 1, wherein substituents for $Ar^1$, $Ar_2$, $Ar^3$, $Ar^4$, $Ar^5$ and $Ar^6$ are selected from the group consisting of $C_{1-18}$ alkyl group, $C_{1-18}$ alkoxy group, dialkylamino group containing two $C_{1-18}$ alkyl groups, $C_{1-18}$ acyl group, $C_{1-18}$ acyloxy group, $C_{1-18}$ amide group, $C_{6-15}$ aryl group, $C_{6-15}$ aryloxy group, halogen atom, hydroxy group, carboxyl group, nitro group, cyano group, and trifluoromethyl group.

4. An electrophotographic photoreceptor as in claim 1, wherein $Ar^1$, $Ar^2$, $Ar^3$, $Ar^4$, $Ar^5$ and $Ar^6$ are phenylene and naphthylene.

5. An electrophotographic photoreceptor as in claim 1, wherein at least one of $Ar^1$, $Ar^2$, $Ar^3$, $Ar^4$, $Ar^5$ and $Ar^6$ is selected from the group consisting of:

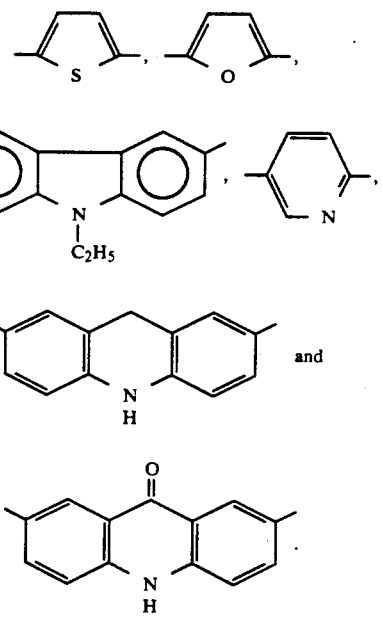

6. An electrophotographic photoreceptor as in claim 1, comprising on an electrically conductive support an electrophotographic light-sensitive layer with a trisazo compound dispersed in a binder or charge-transporting medium.

7. An electrophotographic photoreceptor as in claim 1, comprising on an electrically conductive support a charge-generating layer containing a trisazo compound as a main component and a charge-transporting layer provided thereon.

8. An electrophotographic photoreceptor as in claim 1, comprising on an electrically conductive support a charge-transporting layer and charge-generating layer containing a trisazo compound as a main component provided thereon.

9. An electrophotographic photoreceptor as in claim 1, wherein Cp represents:

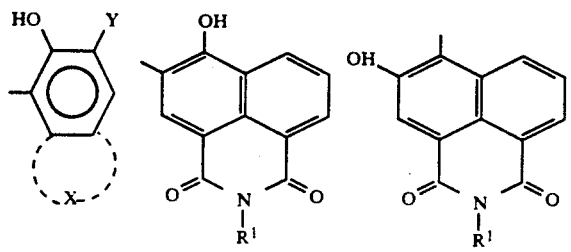

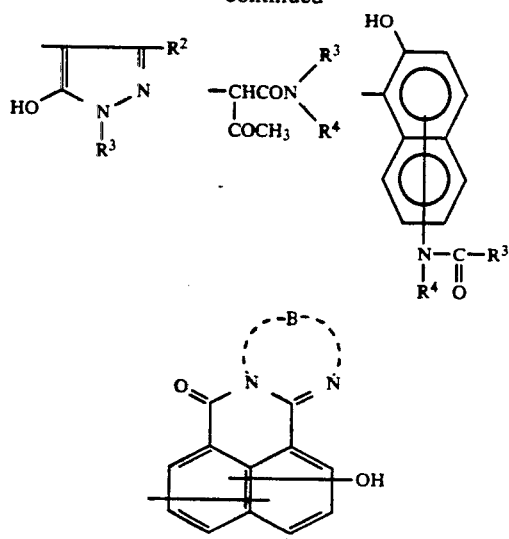

wherein
X represents an atomic group which is required to be condensed with the benzene ring to which hydroxy group and Y are bonded to form an aromatic group or a heterocyclic group;

Y represents $-CONR^3R^4$, $-CONHN=CR^3R^4$ or $COOR^3$;

$R^1$ represents $C_{1-12}$ alkyl or $C_{6-12}$ aryl group;

$R^2$ represents an alkyl group, carbamoyl group, carboxyl group, alkoxycarbonyl group, aryloxycarbonyl group, or a substituted or unsubstituted amino group;

$R^3$ represents an alkyl group, aromatic carbon ring group, or aromatic heterocyclic group, each of which may be substituted;

$R^4$ represents a hydrogen atom or has the same meaning as $R^3$; and

B represents an divalent aromatic hydrocarbon group, each of which may be substituted.

10. An electrophotographic photoreceptor as in claim 9, wherein when X is an aromatic group or heterocyclic group containing substituents, the substituents are selected from the group consisting of a halogen atom, $C_{1-18}$ alkyl groups, a trifluoromethyl group, a nitro group, an amino group, a cyano group and $C_{1-18}$ alkoxy groups, wherein one or more of such substituents may be placed on any position.

11. An electrophotographic photoreceptor as in claim 9, wherein
said substituents for said substituted alkyl groups are selected from the group consisting of a hydroxy group, $C_{1-12}$ alkoxy groups, a cyano group, amino groups, $C_{1-12}$ alkylamino groups, dialkyl groups containing two $C_{1-12}$ alkyl groups, halogen atoms, and $C_{6-15}$ aryl groups, and
said substituents for said substituted aryl group are selected from the group consisting of a hydroxy group, $C_{1-12}$ alkoxy groups, a cyano group, amino groups, $C_{1-12}$ alkylamino groups, dialkyl groups containing two $C_{1-12}$ alkyl groups, halogen atoms, $C_{1-12}$ alkyl groups, a nitro group, and a trifluoromethyl group.

12. An electrophotographic photoreceptor as in claim 9, wherein $R^2$ is selected from the group consisting of $C_{1-16}$ lower alkyl groups, a carbamoyl group, a carboxyl group, alkoxycarbonyl groups containing $C_{1-12}$ alkoxy groups, aryloxycarbonyl groups containing $C_{6-20}$ aryloxy groups, and substituted or unsubstituted amino groups.

13. An electrophotographic photoreceptor as in claim 9, wherein $R^3$ is selected from the group consisting of $C_{1-20}$ alkyl groups, aromatic carbon ring groups, aromatic heterocyclic groups, and substituted groups thereof, wherein if $R^3$ is a substituted alkyl group, substituents are those described with reference to $R^1$, if $R^3$ is an aromatic carbon ring group containing substituents, the substituents are selected from the group consisting of a hydroxy group, cyano group, nitro group, halogen atoms, $C_{1-12}$ alkyl groups, $C_{1-12}$ alkloxy groups, amino groups, $C_{1-12}$ alkylamino groups, $C_{1-12}$ dialkylamino groups, $C_{6-12}$ arylamino groups, diarylamino groups containing two $C_{6-15}$ aryl groups, a carboxyl group, alkaline metal carboxylate groups, alkaline metal sulfonate groups, alkylcarbonyl groups, arylcarbonyl groups containing $C_{6-12}$ aryl groups, $C_{1-12}$ alkylthio groups, and $C_{1-12}$ arylthio groups, wherein the number of these substituents which can be contained in the substituted aromatic carbon ring group is in the range of 1 to 5, wherein if a plurality of these substituents are contained in the substituted aromatic carbon ring group, they may be the same or different, and wherein the position on which these substituents can be placed is arbitrary.

* * * * *